(12) United States Patent
Martin Regalado et al.

(10) Patent No.: US 9,207,419 B2
(45) Date of Patent: *Dec. 8, 2015

(54) FIBER OPTIC OVERHEAD GROUND WIRE CABLES AND PROCESSES FOR THE MANUFACTURING THEREOF

(75) Inventors: Josep Martin Regalado, Milan (IT); Josep Maria Batlle I Ferrer, Milan (IT); Josep Oriol Vidal Casanas, Milan (IT); Valentina Ghinaglia, Milan (IT); Lluis-Ramon Sales Casals, Milan (IT)

(73) Assignee: PRYSMIAN S.P.A., Milan (IT)

( * ) Notice: Subject to any disclaimer, the term of this patent is extended or adjusted under 35 U.S.C. 154(b) by 328 days.

This patent is subject to a terminal disclaimer.

(21) Appl. No.: 13/806,000

(22) PCT Filed: Jul. 19, 2010

(86) PCT No.: PCT/EP2010/060402
§ 371 (c)(1),
(2), (4) Date: Mar. 22, 2013

(87) PCT Pub. No.: WO2012/010191
PCT Pub. Date: Jan. 26, 2012

(65) Prior Publication Data
US 2013/0183013 A1     Jul. 18, 2013

(51) Int. Cl.
*G02B 6/44* (2006.01)
*B21C 23/24* (2006.01)

(52) U.S. Cl.
CPC ............. *G02B 6/4401* (2013.01); *B21C 23/24* (2013.01); *G02B 6/4422* (2013.01); *G02B 6/4486* (2013.01); *Y10T 29/49826* (2015.01)

(58) Field of Classification Search
CPC ....... G02B 6/4494; G02B 6/443; G02B 6/441; G02B 6/4429; G02B 6/4432; G02B 6/4434

USPC .......................... 385/100, 102, 103, 104, 106
See application file for complete search history.

(56) References Cited

U.S. PATENT DOCUMENTS 4,156,104 A    5/1979  Mondello
5,125,062 A    6/1992  Marlier et al.
(Continued)

FOREIGN PATENT DOCUMENTS

DE    9013175 U1    2/1991
EP    0092980 A2    11/1983
(Continued)

OTHER PUBLICATIONS

International Search Report PCT/ISA/210 for International Application No. PCT/EP2010/060402 dated Mar. 24, 2011.
(Continued)

*Primary Examiner* — Jennifer Doan
(74) *Attorney, Agent, or Firm* — Harness, Dickey & Pierce, PLC

(57) ABSTRACT

A process for manufacturing fiber optic overhead ground wire cable may include: providing an optical core; providing a reinforcing structure consisting of at least one layer of wires onto the optical core, wherein at least part of the wires are clad with first metallic material; extruding an outer layer onto the reinforcing structure, wherein the outer layer is made of second metallic material having a softening point substantially similar to a softening point of the first metallic material; and cooling the outer layer immediately after extruding the outer layer. A fiber optic overhead ground wire cable may include: an optical core comprising a plurality of optical fibers housed in an inner tube; and a reinforcing structure consisting of at least one layer of wires stranded onto the optical core. The cable may be substantially devoid of interstices between the at least one layer of wires and the inner tube.

16 Claims, 3 Drawing Sheets

(56) References Cited

U.S. PATENT DOCUMENTS

| | | | |
|---|---|---|---|
| 5,133,126 | A | 7/1992 | Matsuoka |
| 5,222,173 | A | 6/1993 | Bausch |
| 5,787,217 | A | 7/1998 | Traut et al. |
| 7,386,208 | B2 * | 6/2008 | Bosisio et al. ............ 385/102 |
| 2010/0014818 | A1 | 1/2010 | Sales Casals et al. |

FOREIGN PATENT DOCUMENTS

| | | |
|---|---|---|
| EP | 0099745 A1 | 2/1984 |
| EP | 0467294 A1 | 1/1992 |
| GB | 2101505 A | 1/1983 |
| JP | 59219703 A | 12/1984 |
| WO | WO-01/09658 A1 | 2/2001 |
| WO | WO-02/054131 A1 | 7/2002 |
| WO | WO-03091782 A1 | 11/2003 |
| WO | WO-2006102910 A1 | 10/2006 |

OTHER PUBLICATIONS

International Telecommunication Union ITU-T Recommendation G.652: Series G: Transmission Systems and Media Digital Systems and Networks, pp. i-iii and 1-15, Jun. 2005.

International Telecommunication Union ITU-T Recommendation G.655: Series G: Transmission Systems and Media Digital Systems and Networks, pp. i-iv and 1-18, Nov. 2009.

International Electrotechnical Commission IEC Standard: Publication 61232, Ed. 1.0, pp. 21,23,25, Jun. 9, 1993.

International Electrotechnical Commission IEC Publication 60724, pp. B-7,8,9,11,13, C-1,3,5,7,9,11,13, and D-1 to D-6, 1984.

International Search Report PCT/ISA/210 for International Application No. PCT/EP2010/060405 dated Mar. 25, 2011.

\* cited by examiner

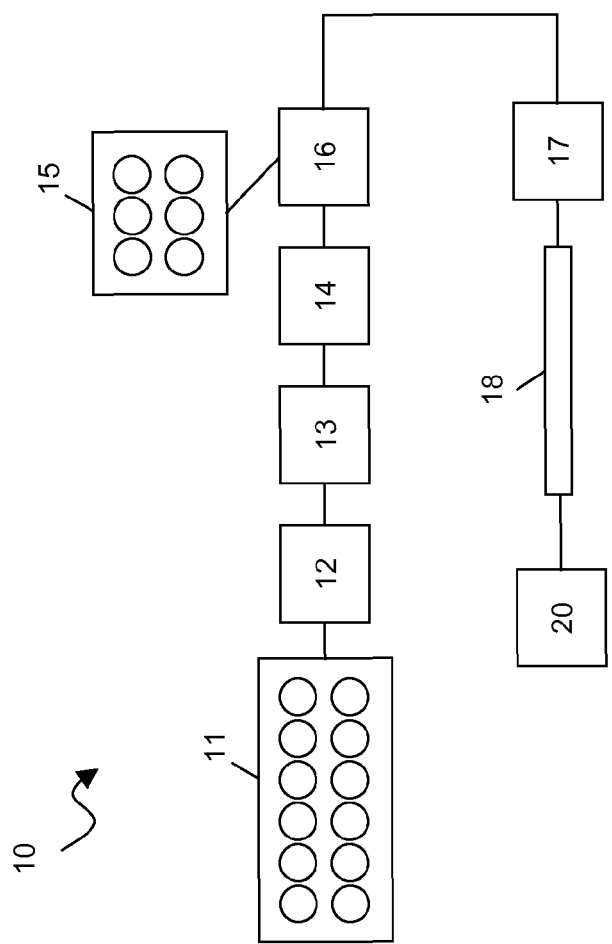

FIBER OPTIC OVERHEAD GROUND WIRE CABLES AND PROCESSES FOR THE MANUFACTURING THEREOF

CROSS-REFERENCE TO RELATED APPLICATION(S)

This application is a national stage entry from International Application No. PCT/EP2010/060402, filed on Jul. 19, 2010, in the Receiving Office of the European Patent Office, the entire contents of which are incorporated herein by reference.

TECHNICAL FIELD

The present invention relates to the field of optical communications networks. In particular, the present invention relates to a fiber optic overhead ground wire (briefly, OPGW) cable and to a process for the manufacturing thereof.

BACKGROUND ART

A fiber optic overhead ground wire (briefly, OPGW) is an aerial cable suitable for being employed in electric power transmission or distribution lines. For example, OPGW cable can run between the tops of high-voltage pylons of an electric power transmission or distribution line, and performs two distinct functions at the same time: a grounding function (i.e., it connects the aerial line to earth ground for protecting the electric power transmission or distribution line against lightning strikes) and a telecommunications function (i.e., it supports transmission of data).

Construction of OPGW cable typically comprises an optical core containing optical fibers within an inner tube—generally made of stainless steel, aluminium or polymeric material—surrounded by one or more layer(s) of metal wires encircled, in turn, by an outer aluminium layer. The optical fibers perform the telecommunications function, and the metal layers perform the grounding function while protecting the optical core against mechanical stresses.

EP 0 092 980 discloses an overhead electric conductor. In particular, a flexible elongate body comprises a substantially circumferentially rigid and substantially circumferentially continuous central core of aluminium or an aluminium-based alloy having an elongate compartment within and extending throughout the length of the core; at least one optical fibre loosely housed in the elongate compartment; at least one layer of bare elongate elements of steel surrounding the central core; and at least one substantially circumferentially continuous outer layer of aluminium or an aluminium-based alloy surrounding the layer or layers of steel bare elongate elements, aluminium or aluminium-based alloy of the central core and/or of the outer layer at least partially filling interstices between the steel bare elongate elements. The circumferentially continuous outer layer of aluminium or an aluminium-based alloy is initially a single extrudate of substantially C-shaped transverse cross-section, one or each of the limbs of the C having been folded inwardly so that the gap between the free ends of the limbs is closed. Alternatively, the circumferentially continuous outer layer of aluminium or aluminium-based alloy may be a drawn-down tube.

U.S. Pat. No. 5,787,217 discloses groundwire cables for use with overhead power transmission lines. In particular, a unitary optical fiber core structure is surrounded by high tension metal or metal alloy strength members, preferably steel wires. Moving radially outward, in turn are encased within a metal or metal alloy tube which hermetically seals the fiber core structure and binds high tension wires. Tube may be, e.g. aluminum, in the case of terrestrial ground wire.

GB 2101505 discloses a method for manufacturing an optical fiber cable for submarine use. The optical fiber cable core comprises a plurality of optical fibers held together around a strength member to comprise an optical preform. The preform is arranged in an aluminium tube. A layer of high tensile steel wires are stranded helically over the tube, thereby forming a stranded strength member. An oversize aluminium tube is then directly extruded coaxially over the stranded strength member by a continuous extrusion process. The tube is subsequently drawn down and swung onto the stranded strength member so that the tube material fills at least the interstitial spaces between the wires and is in intimate contact with the layer of stranded wires.

SUMMARY OF THE INVENTION

The Applicant has noticed that the above known cables exhibit empty interstices around the wires comprised in their structures. Such interstices reduce the electrical conductivity of the cable (and therefore also its short circuit capacity, i.e. its grounding efficiency), since the electrical conductivity of the air that fills the interstices is much lower than the electrical conductivity of the metallic materials providing the grounding function in such cables. The electrical conductivity of the cable may in principle be increased by increasing the external diameter of the cable, so that the cross-sectional area of the metallic material providing the grounding function may be increased. However, this solution implies cost increase and a greater cable dimension.

In view of the above, the Applicant has tackled the problem of providing a fiber optic overhead ground wire (briefly, OPGW) cable comprising a reinforcing structure consisting of at least one layer of wires, said cable having an increased conductivity and having substantially all of the interstices possibly present in the cable filled with metal, in particular the interstices between the wires and the inner tube, which are not filled in the prior art cables.

Further, the Applicant has tackled the problem of providing a process for manufacturing an OPGW cable comprising a reinforcing structure consisting of at least one layer of wires stranded over the optical core, said process allowing substantially completely filling the interstices between the wires and both inner and outer layers, said process being as simple as possible and of minimum risk of damaging the optical fibers contained in the cable.

This problem is solved by providing an OPGW cable with a reinforcing structure consisting of at least one layer of wires, at least part of said wires being clad with a first metallic material, and embedding the wires in an outer layer of a second metallic material having a softening point substantially similar to that of the first metallic material of the wire claddings. The embedding step is performed by extruding the outer layer and cooling it just after extrusion.

In the present description and in the claims, the expression "at least part of the wires are clad" means that, if R is the number of wires comprised in a cable, K wires are clad, K being lower than or equal to R and being such that the cable does not comprise two adjacent unclad wires.

In the present description and in the claims, as "softening point of a metallic material" it is meant a temperature at which the metallic material can be extruded, such temperature being in a range of from 50% to 75% of the melting point of the metallic material.

In the present description and in the claims, the concept of a metallic material having a softening point substantially similar to that of another metallic material means that the softening temperature ranges of the metallic materials in question at least partially overlap.

During extrusion of the outer layer, the claddings of the wires soften and substantially completely fill the interstices among the wires and the interstices between the wires and outer surface of the underlying layer.

To facilitate the filling of the interstices by the metal of the claddings, the extrusion of the outer layer is advantageously performed under pressure.

The softened metallic material of the claddings fuses together with the softened extruded metallic material of the outer layer, so that wires and outer layer give place to a substantially solid structure advantageous from both the mechanical and the electrical point of view.

The ensemble wires/outer layer substantially devoid of interstices advantageously behaves as one single conductor having (given a certain external diameter) an increased across sectional area, and therefore having an increased conductivity. This advantageously increases the short circuit capacity of the OPGW cable, without increasing its external diameter.

The step of cooling the outer layer just after extrusion advantageously allows preventing possible damages to the optical core, for example to the optical fibers, but also to the inner tube housing them.

Differently from the known processes, the process according to the present invention advantageously allows filling all the interstices substantially without leaving any free space, and prevents formation of the interstices between the wires and the outer layer by a single manufacturing step (i.e. extrusion of the outer layer).

According to a first aspect, the present invention relates to a process for manufacturing a fiber optic overhead ground wire cable, said process comprising the steps of:

a) providing an optical core;
b) providing a reinforcing structure consisting of at least one layer of wires onto said optical core, at least part of said wires being clad with a first metallic material;
c) extruding an outer layer onto said reinforcing structure consisting of at least one layer of wires, said outer layer being made of a second metallic material having a softening point substantially similar to the softening point of said first metallic material; and
d) cooling the outer layer immediately after extruding.

Preferably, the first metallic material is selected from: aluminium, aluminium alloy, copper, copper alloy.

Preferably, the second metallic material is selected from: aluminium, aluminium alloy, copper, copper alloy.

Profitably, the first metallic material and the second metallic material are substantially the same material.

Advantageously, the step of extruding the outer layer onto the reinforcing structure is performed under pressure. The extrusion pressure is advantageously higher than 500 bar, preferably from 600 bar to 700 bar. Application of pressure during extrusion facilitates the filling of the interstices and speeds the process up, thus minimizing the effect of the heat applied during the extrusion on the optical cable.

Preferably, the step of extruding the outer layer onto the reinforcing structure is performed at an extrusion temperature of from 400° C. to 500° C. Advantageously, an extrusion temperature of from 420° C. to 480° C. is applied.

Preferably, the step of extruding the outer layer onto the reinforcing structure is performed at an extrusion speed higher than 20 m/min, more preferably higher than 25 m/min. The extrusion speed can be up to 60 m/min.

Preferably, the step of extruding the outer layer onto the reinforcing structure is performed by an extruder comprising a male die and a female die, wherein the male die and the female die are in a side-by-side relationship.

Preferably, the male die is neckless.

Preferably, the male die is located with the downstream end some millimeters, e.g. 3-8 mm, away the upstream end of the female die.

According to another aspect, the present invention relates to a fiber optic overhead ground wire cable comprising an optical core comprising a plurality of optical fibers housed in an inner tube, and a reinforcing structure consisting of at least one layer of wires stranded onto the optical core, at least part of the wires being clad with a first metallic material, the reinforcing structure consisting of at least one layer of wires being embedded in an outer layer of a second metallic material, said cable being substantially devoid of interstices between the wires and the inner tube.

Preferably, the inner tube is made of metallic material. Preferred metallic materials for the inner tube are stainless steel and aluminium, more preferably aluminium.

Alternatively, the inner tube can be made of polymeric material, preferably polyethylene.

Preferably, the cable comprises a reinforcing structure consisting of one layer of wires. Thanks to the embedding into the outer layer, a single layer of wires provides at least the requested mechanical strength with no need of additional layers.

Preferably, the first metallic material is selected from: aluminium, aluminium alloy, copper, copper alloy.

Preferably, the second metallic material is selected from: aluminium, aluminium alloy, copper, copper alloy.

Each of the clad wires comprises a core and a cladding, the core being made of a third metallic material having a softening point substantially higher than the softening point of the first metallic material of the claddings. A preferred third metallic material is steel.

BRIEF DESCRIPTION OF THE DRAWINGS

The present invention will become fully clear by reading the following detailed description, to be read by referring to the accompanying drawings, wherein:

FIG. 3 is a schematic representation of an apparatus for manufacturing the OPGW cable of FIG. 1.

DETAILED DESCRIPTION OF PREFERRED EMBODIMENTS OF THE INVENTION

For the purpose of the present description and of the appended claims, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

Figure 1:
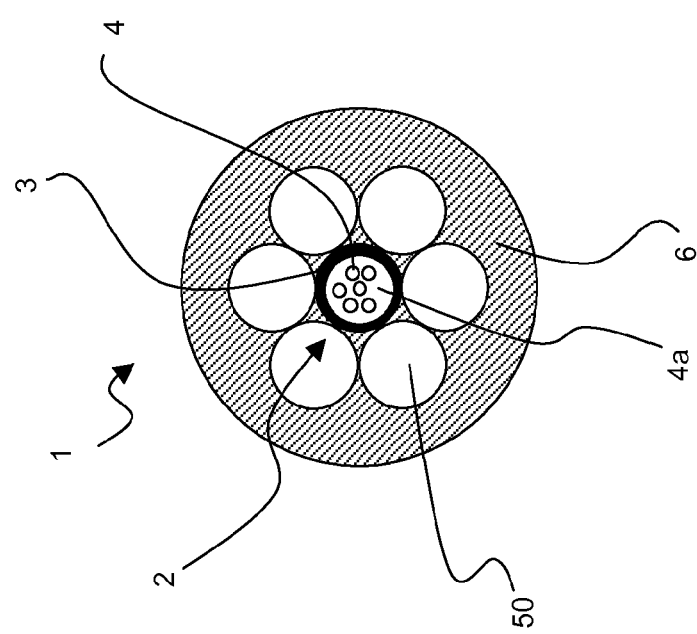
FIG. 1 is a cross-sectional view of an OPGW cable according to the present invention.

FIG. 1 shows an OPGW cable 1 according to the present invention. Cable 1 comprises an optical core 2. The optical core 2 in turn comprises an inner tube 3 housing a number of optical fibers 4. By way of mere example, the cable 1 shown in FIG. 1 comprises six optical fibers 4.

The optical fibers 4 may be of any known type suitable for long-haul applications. For instance, the optical fibers 4 may be standard single mode optical fibers compliant with the ITU-T Recommendation G.652 (June 2005). Alternatively, the optical fibers 4 may be NZDS (Non-Zero Dispersion Shifted) optical fibers compliant with the ITU-T Recommendation G.655. The optical fibers 4 are preferably loosely arranged within the inner tube 3, with a certain excess length.

The inner tube 3 may also contain a filling compound 4a, for instance a hydrogen absorbent jelly that protects the optical fibers 4 against hydrogen attacks.

Preferably, the thickness of the tubular sidewall of the inner tube 3 is of from 0.20 mm to 0.30 mm.

The inner tube 3 may be made of a polymeric material, such as polyethylene, for example, high density polyethylene (HDPE), or of a metallic material, for example steel, for example stainless steel such as AISI 304 or AISI 316, or aluminium.

As an example, in case stainless steel tube is considered, the thickness of the sidewall of the inner tube 3 can be of from 0.2 mm to 0.3 mm. For aluminium or HDPE tube, thickness should be greater. For example, said thickness may be comprised between 1.0 mm and 2.5 mm.

The cable 1 further comprises a number of wires 5. Wires 5 are stranded onto the inner tube 3, so as to form one or more concentric reinforcing layers surrounding the optical core 2. Preferably, the cable of the invention has a reinforcing structure consisting of a single layer. By way of example, the cable 1 shown in FIG. 1 comprises six wires 5 forming a reinforcing structure surrounding the optical core 2.

Figure 2:
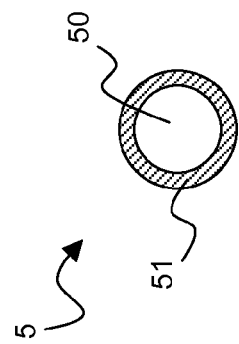
FIG. 2 is a cross-sectional view of a wire comprised in the cable of FIG. 1.

Wires 5 are metal wires. In particular, with reference to FIG. 2, each wire 5 comprises a core 50 and a cladding 51. The core 50 is made of a third metallic material, while the cladding 51 is made of a first metallic material different from the third metallic material. The softening point of the third metallic material is preferably substantially higher than the softening point of the first metallic material. For example, each wire is made of ACS (Aluminium Clad Steel), i.e. each core 50 is made of steel and the relevant cladding 51 is made of aluminium. The ACS wires may be either standard ACS wires as defined by IEC 61232 Ed. 1.0, 09.06.1993 (namely 20SA, 27SA, 30SA or 40 SA), or non-standard ACS wires whose ratio steel/aluminium has a non-standardized value. Alternatively, the core 50 may be made of galvanized steel or an aluminium alloy.

Although in the embodiment shown in the drawings all the wires 5 comprise a cladding 51, this is a mere example. More generally, at least part of the wires 5 is clad. For instance, if the cable comprises R wires (R being, for instance, an even integer), R/2 wires may be clad and R/2 wires may be unclad. In that case, the wires are preferably arranged so that the clad wires and the unclad wires alternate.

The external diameter of each wire 5 is preferably of from 1 mm to 5 mm, more preferably from 2 mm to 3.5 mm.

Cable 1 further comprises an outer layer 6 surrounding the reinforcing structure of one or more layer(s) of wires 5. The outer diameter of the outer layer 6 is preferably of from 10 mm to 20 mm, more preferably of from 12 mm to 18 mm.

The outer layer 6 is made of a second metallic material. In particular, the outer layer 6 is made of a second metallic material having a softening point substantially similar to the softening point of the first metallic material of cladding 51. For example, the second metallic material can be selected from aluminium, aluminium alloy, copper, copper alloy.

The first metallic material and the second metallic material can be the same material.

As it will be described in further detail herein after, the outer layer 6 is extruded directly onto the reinforcing structure consisting of at least one layer of wires 5. The temperature and pressure reached during the extrusion process induces softening of the first metallic material of claddings 51 of the wires 5. The softened first metallic material flows to advantageously fill the interstices among wires 5 and the interstices between wires 5 and the outer surface of the inner tube 3. Further, the first metallic material of the claddings 51 advantageously intermingles or fuses together with the second metallic material of the outer layer 6 during extrusion, and accordingly forms a substantially solid structure advantageous from both the mechanical and the electrical point of view.

In the cable 1 of the invention the wires 5 are embedded within first and second metallic material. There are substantially no interstices around wires 5. The ensemble wires 5/outer layer 6 advantageously behaves as one single conductor providing the grounding function. Further, said ensemble advantageously imparts improved mechanical properties to the cable 1.

With reference now to FIG. 3, an apparatus for manufacturing the cable 1 according to a preferred embodiment of the present invention will be described.

The apparatus 10 preferably comprises a fiber unrolling tool 11, a bundling tool 12, a jelly injection tool 13, a first extruder 14, a wire unrolling tool 15, a winding tool 16, a second extruder 17, a cooling tool 18 and a collecting tool 20. The various parts (tools and extruders) of the apparatus 10 are concatenated each other so as to form a continuous manufacturing line (or plant).

The fiber unrolling tool 11 preferably comprises N spools of optical fibers (schematically represented by circles in FIG. 3), N being equal to the number of optical fibers 4 to be included in the cable 1. Similarly, the wire unrolling tool 15 preferably comprises M spools of wires (also schematically represented by circles in FIG. 3), M being equal to the number of wires 5 to be included in the cable 1.

By the fiber unrolling tool 11, N optical fibers 4 are unrolled from the respective spools, and then passed through the bundling tool 12 to form a fiber bundle.

The fiber bundle is passed through the jelly injection tool 13 providing the filling compound 4a. This is an optional step.

Then, the fiber bundle is passed through the first extruder 14 providing, preferably by extrusion, the inner tube 3 around the fiber bundle. Instead of the first extruder 14, the apparatus 10 may comprise a tool providing a continuous metal strip, shaping the metal strip in the form of a C-section around the fiber bundle, and finally hermetically sealing by welding or soldering the strip along its longitudinal ends, thereby providing a metallic inner tube 3. Such an alternative is less preferred.

The inner tube 3 with the optical fibers 4 housed therein is passed through the winding tool 16. The winding tool 16 preferably receives M wires 5 unrolled from the spools of the wire unrolling tool 15, and preferably winds them according to an open helix (or "S-Z") pattern onto the inner tube 3, thereby forming one or more layers of wires 5.

The inner tube 3 with the optical fibers 4 housed therein and the wires 5 wound thereon is then passed through the second extruder 17. The second extruder 17 extrudes the outer layer 6 onto the layer of wires 5. In particular, the outer layer 6 is preferably obtained by extruding a metallic material that, as mentioned above, has a softening point substantially similar to that of the metallic material of which claddings 51 of the wires 5 are made. The extrusion process is preferably performed at a speed high enough to prevent the heat of the process from raising the temperature of the elements enclosed within the outer layer 6 (in particular, the optical core 2) to a value that may damage the inner tube 3, the optical fibers 4 or the filling compound 4a, if present. In particular, the extrusion process is preferably performed at a speed higher than 20 m/min, more preferably higher than 25 m/min. For example, the speed of the extrusion process can be up to 60 m/min.

The pressure within the second extruder 17 is preferably higher than 500 bar, more preferably it is of from 600 bar to 700 bar. The extrusion temperature is preferably between 400° C. and 500° C., more preferably between 420° C. and 480° C. As will be apparent to the skilled in the art, the choice of the temperature depends on the first and second metallic materials, and on the materials employed for the manufacturing of the optical core 2.

Figure 4:
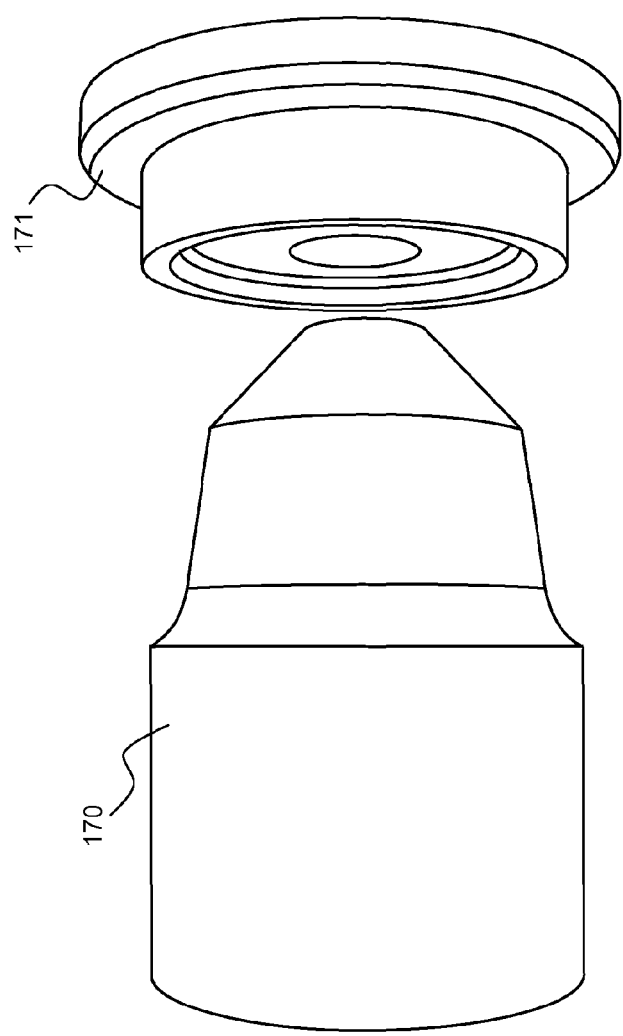
FIG. 4 is a schematic illustration of a configuration female/male extrusion die according to a preferred embodiment of the present invention.

The second extruder 17, as shown in FIG. 4, comprises a male die 170 and a female die 171. The male die 170 is neckless. The male die 170 and the female die 171 are preferably in a side-by-side relationship. In particular, the male die 170 is positioned at some millimeters away from the female die 171. Advantageously, the male die 170 is positioned 4-6 mm away from the female die 171. The extrusion carried out with the die configuration shown in FIG. 4 is advantageously performed under pressure.

As mentioned above, within the second extruder 17, the temperature and pressure reached during the extrusion process induces softening of the claddings 51. The softened metallic material of the claddings 51, due also to the pressure values applied in the second extruder 17 (higher than 500 bar), advantageously fills the interstices among the wires 5 and the interstices between the wires 5 and the outer surface of the inner tube 3. The metallic material of the claddings 51 advantageously fuses substantially together with the metallic material of the outer layer 6, thus forming a substantially solid structure advantageous from both the mechanical and the electrical point of view. As a result, the cores 50 of the wires 5 are embedded within metallic material.

Just after extrusion, the outer layer 6 is cooled through the cooling tool 18, where the temperature and pressure are reduced preferably to room temperature and atmospheric pressure, respectively. Preferably, the cooling tool 18 comprises a water bath through which the outer layer 6 is passed. The water bath is such that after few meters in the water bath (i.e. after few seconds, assuming that the speed at which the outer layer 6 is supplied to the water bath is higher than 25 m/min), the temperature of the outer layer 6 and of the elements embedded therein (i.e. the optical core 2 and the wires 5) reaches the room temperature. Cooling the outer layer 6 just after extrusion in such a short time advantageously allows preventing possible damages to the optical core, since the heat supplied to the outer layer 6 during extrusion is rapidly removed immediately after extrusion, thereby preventing it from reaching the optical core 2 and raising its temperature to dangerous values.

The cable 1 is finally collected on one or more collecting drums at the collecting stage 20.

Tests were carried out on a so produced cable. In particular, an OPGW cable comprising an optical core in turn comprising 48 optical fibers embedded in a hydrogen absorbent jelly, surrounded by an inner tube made of stainless steel and having an internal diameter of about 3.5 mm and an external diameter of about 4.0 mm was manufactured. The optical core was surrounded by eight wires made of ACS 20AS, forming one reinforcing layer. Each of the wires had a diameter of about 2.42 mm. An outer layer of aluminium was extruded onto the wires at 460±20° C. under a pressure of 600-700 bar. The overall diameter of the resulting OPGW cable was 16.2 mm. The measured weight of the resulting cable was 690 kg/km and the measured Rated Tensile Strength (RTS) was 5700 kg. The resulting cable did exhibit substantially no interstice around the wires and between the wires and the inner tube.

The short circuit capacity of the cable was evaluated according to IEC 60724 (1984) and a value of 305 $KA^2s$ at 40° C. was found. Further, mechanical tests have also been performed on the cable (in particular, the stress strain, ultimate tensile strength, crush and sheave were measured). A strain margin comprised between 0.5% and 0.6% as in the buffer tube was found. No attenuation of the optical fibers during the stress-strain, crush and sheave tests was found. A measurement of the Ultimate Tensile Strength (UTS) was about of 7000 Kg (123% of RTS).

The OPGW cable according to the present invention is provided with increased electrical conductivity and hence with an increased high short-circuit capacity in comparison to known OPGW cables having the same external diameter.

The cable is easily and safely manufactured.

Cooling the outer layer just after extrusion advantageously allows preventing possible damages to the optical fibers of the optical core.

The process is carried out in a single manufacturing step.

The invention claimed is:

1. A process for manufacturing fiber optic overhead ground wire cable, the process comprising:
    providing an optical core;
    providing a reinforcing structure consisting of at least one layer of wires onto the optical core, wherein at least part of the wires are clad with first metallic material;
    extruding an outer layer onto the reinforcing structure, wherein the outer layer is made of second metallic material having a softening point substantially similar to a softening point of the first metallic material; and
    cooling the outer layer immediately after extruding the outer layer.

2. The process of claim 1, wherein the first metallic material is selected from aluminum, aluminum alloy, copper, and copper alloy.

3. The process of claim 1, wherein the second metallic material is selected from aluminum, aluminum alloy, copper, and copper alloy.

4. The process of claim 1, wherein the first metallic material and the second metallic material are substantially the same material.

5. The process of claim 1, wherein extruding the outer layer is performed under pressure.

6. The process of claim 1, wherein extruding the outer layer is performed under a pressure greater than 500 bar.

7. The process of claim 1, wherein extruding the outer layer is performed at an extrusion temperature of from 400° C. to 500° C.

8. The process of claim 1, wherein extruding the outer layer is performed at an extrusion speed greater than 20 meters/minute.

9. A fiber optic overhead ground wire cable, comprising:
    an optical core comprising a plurality of optical fibers housed in an inner tube; and
    a reinforcing structure consisting of at least one layer of wires stranded onto the optical core;
    wherein at least part of the at least one layer of wires is clad with first metallic material,
    wherein the reinforcing structure is embedded in an outer layer of second metallic material having a softening point substantially similar to a softening point of the first metallic material, and wherein the cable is substantially devoid of interstices between the at least one layer of wires and the inner tube.

10. The fiber optic overhead ground wire cable of claim 9, wherein the inner tube is made of polymeric material.

11. The fiber optic overhead ground wire cable of claim 9, wherein the inner tube is made of metallic material.

12. The fiber optic overhead ground wire cable of claim 9, wherein the reinforcing structure consists of one layer of wires.

13. The fiber optic overhead ground wire cable of claim 9, wherein the first metallic material is selected from aluminum, aluminum alloy, copper, and copper alloy.

14. The fiber optic overhead ground wire cable of claim 9, wherein the second metallic material is selected from aluminum, aluminum alloy, copper, and copper alloy.

15. The fiber optic overhead ground wire cable of claim 9, wherein each of the clad wires comprises a core and a cladding, and
   wherein the core is made of third metallic material having a softening point substantially greater than the softening point of the first metallic material.

16. The fiber optic overhead ground wire cable of claim 9, wherein the first metallic material is substantially the same as the second metallic material.

* * * * *